(12) United States Patent
Heidler et al.

(10) Patent No.: US 8,346,042 B2
(45) Date of Patent: Jan. 1, 2013

(54) APPARATUS AND METHOD FOR PROCESSING AT LEAST ONE OPTICAL WAVEGUIDE

(75) Inventors: Christian Heidler, Hohenschaeftlarn (DE); Rainer M. Kossat, Aschau (DE)

(73) Assignee: CCS Technology, Inc., Wilmington, DE (US)

( * ) Notice: Subject to any disclaimer, the term of this patent is extended or adjusted under 35 U.S.C. 154(b) by 383 days.

(21) Appl. No.: 12/685,356

(22) Filed: Jan. 11, 2010

(65) Prior Publication Data

US 2010/0183273 A1    Jul. 22, 2010

(30) Foreign Application Priority Data

Jan. 19, 2009 (EP) ..................................... 09150876

(51) Int. Cl.
G02B 6/00 (2006.01)
(52) U.S. Cl. ..................... 385/134; 385/136; 385/147

(58) Field of Classification Search ................ 385/134, 385/147

See application file for complete search history.

(56) References Cited

U.S. PATENT DOCUMENTS

| 5,253,035 A * | 10/1993 | Fukuoka et al. | 356/73.1 |
| 6,904,226 B2 | 6/2005 | Kritler et al. | 385/147 |
| 2005/0230052 A1* | 10/2005 | Christopher et al. | 156/367 |
| 2008/0196450 A1 | 8/2008 | Hogari et al. | 65/452 |

FOREIGN PATENT DOCUMENTS

EP    1241496 A2    3/2002

* cited by examiner

*Primary Examiner* — Ryan Lepisto
(74) *Attorney, Agent, or Firm* — Russell S. Magaziner

(57) ABSTRACT

An apparatus for processing at least one optical waveguide comprises a combination of a stripper, a cleaner and a cleaver. The stripper, the cleaner and the cleaver are adapted to remove a coating of the optical waveguide, clean and cleave the at least one optical waveguide. The apparatus comprises at least one sensor to determine a feature of the at least one optical waveguide.

9 Claims, 9 Drawing Sheets

FIG 5

APPARATUS AND METHOD FOR PROCESSING AT LEAST ONE OPTICAL WAVEGUIDE

RELATED APPLICATIONS

This application claims the benefit of European Patent Application No. 09150876.2, filed Jan. 19, 2009, the entire contents of which are hereby incorporated by reference.

BACKGROUND

The disclosure relates to an apparatus for processing at least one optical waveguide and a method for processing at least one optical waveguide.

In the technical field of connecting optical waveguides, an assembler is often faced with the problem that his workplace has limited possibilities to deposit devices, for example strippers or cleaving devices for optical fibres. Furthermore, a plurality of devices is required which are used alternately.

It is desirable to provide an apparatus for processing at least one optical waveguide and a method of processing at least one optical waveguide which are easy to operate.

SUMMARY

According to an embodiment, an apparatus for processing at least one optical waveguide comprises a combination of a stripper, a cleaner and a cleaver. The stripper is adapted to remove an outer coating of a part of the at least one optical waveguide. The cleaner is adapted to clean the part of the at least one optical waveguide. The cleaver is adapted to cleave the at least one optical waveguide. The apparatus further comprises at least one sensor for determining a feature of the at least one optical waveguide.

In an embodiment, the sensor is arranged adjacent to the cleaver to determine a position of the feature with respect to the cleaver.

The apparatus may comprise an actuator assembly to move the at least one optical waveguide with respect to at least one of the stripper, the cleaner and the cleaver.

The apparatus may comprise at least one activation switch to activate the stripper. The activation of the stripper may activate the actuator assembly.

In an embodiment, the actuator assembly comprises at least one roller. The at least one roller being rotatable to move the at least one optical waveguide and being capable of clamping the at least one optical waveguide.

The apparatus may comprise a container. The cleaner may be capable of moving at least one waste end of the at least one optical waveguide into the container.

The cleaner may comprise at least one cleaning ribbon to clean the part of the at least one optical waveguide. The apparatus may comprise a clip preparation unit for coupling the at least one optical waveguide to a clip.

The stripper, the cleaner and the cleaver respectively may be arranged partly on a support and partly on a top. The top may be moveable with respect to the support.

The at least one sensor may comprise an optical sensor. The one or more sensors may be adapted to determine a position of the at least one optical waveguide comprising the outer coating and with the outer coating being removed. For instance, the sensor may comprise an optical sensor, but other suitable sensors are possible.

The stripper, the cleaner and the cleaver are disposed in a linear relationship along the longitudinal extension of the at least one optical waveguide. The cleaner may be disposed between the stripper and the cleaver.

A method for processing at least one optical waveguide comprises inserting a part of the at least one optical waveguide into an apparatus for processing at least one optical waveguide. The at least one optical waveguide is moved to partly remove a coating of the part and to partly expose an optical fiber of the at least one optical waveguide. The at least one optical waveguide is moved to clean the exposed optical fiber. The moving is stopped in response to a signal which comprises information representative of a position of the at least one optical waveguide with respect to the apparatus. The signal may be an electric signal or an other suitable signal. Thereafter, the at least one optical waveguide is cleaved if desired.

The method may further comprise fixing a clip to the exposed part previous to the cleaving.

In an embodiment the method comprises moving a blade to cleave the at least one optical waveguide. A cleaved-off part of the at least one optical waveguide is moved into a container. The movement of the blade may cause that the cleaved-off part is moved into the container.

It is to be understood that both the foregoing general description and the following detailed description, and are intended to provide an overview or framework for understanding the nature and character of the invention as it is claimed. The accompanying drawings are included to provide a further understanding of the invention, and are incorporated into and constitute a part of this specification. The drawings illustrate various embodiments, and together with the description serve to explain the principals and operation.

DETAILED DESCRIPTION

Reference will now be made in detail to the preferred embodiments, examples of which are illustrated in the accompanying drawings. Whenever possible, like reference numbers will be used to refer to like components or parts.

Figure 1:
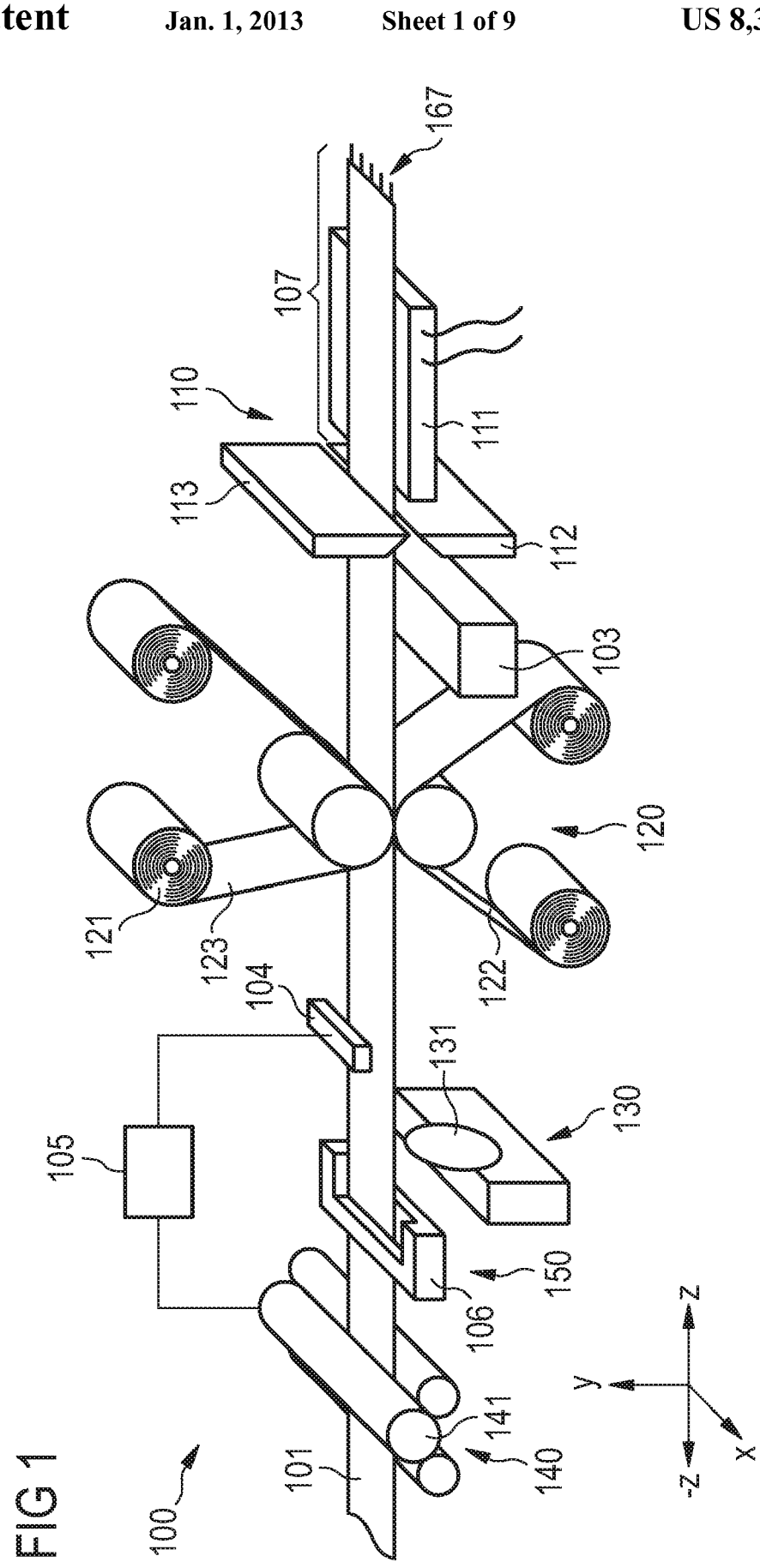
FIG. 1 schematically shows an apparatus according to an embodiment.

FIG. 1 shows an apparatus 100 for processing an optical waveguide 101. The apparatus 100 comprises a stripper 110. The stripper 110 comprises a heater 111 and at least two blades 112 and 113. The heater 111 is adapted to heat the optical waveguide 101. The blades 112 and 113 are moveable along the Y-axis perpendicular to the longitudinal axis of the optical waveguide 101. In an other embodiment, one of the blades 112 and 113 is moveable along the Y-axis, which is generally perpendicular to the longitudinal axis of the optical waveguide 101, while the other one of the blades 112 and 113 is immoveable relative to the longitudinal axis of the optical waveguide 101. The longitudinal axis of the optical waveguide 101 extends along the Z-axis.

The blades 112 and 113 are each moveable between a closed position and an open position. In yet an other embodiment, only one of the blades 112 and 113 is moveable between a closed position and an open position. In the open position, the optical waveguide 101 can be inserted between the two blades 112 and 113. In the closed position, the stripping blades engage with a coating 164 (FIG. 10) of the optical waveguide. In the open position, the optical waveguide is able to move between the blades without obstruction.

The heater 111 heats at least the coating of a part 107 of the optical waveguide 101. The part 107 is adjacent to an end 167 of the optical waveguide 101. The part 107 reaches from the end 167 to the blades 112 and 113. When the blades 112 and 113 are in the closed position and the optical waveguide is moved rearwards such that the optical waveguide is moved through the blades 112 and 113, the coating 164 is removed from the optical waveguide 101 along the part 107. Due to the heating with the heater 111 removal of the coating is facilitated.

A cleaner 120 is disposed adjacent to the stripper 110. The cleaner 120 and the stripper 110 are disposed along the Z-axis with respect to each other. The cleaner 120 and the stripper 110 are disposed in a linear relationship along the longitudinal direction of the optical waveguide. The cleaner 120 comprises a first 122 and a second cleaning 123 member. The cleaning members 122 and 123 may be moved along the Y-axis with respect to each other, such that the cleaning members engage the optical waveguide 101 in a closed position. The cleaning members 122 and 123 may rotate and roll-up and roll-off respectively a cleaning ribbon 121 to clean at least the part 107 from which the coating 164 has been removed by the stripper 110. The cleaning ribbon 121 may comprise cotton wool, synthetics and/or any other suitable material which is capable of cleaning the optical waveguide.

A cleaver 130 is disposed adjacent to the cleaner 120. The cleaver 130, the cleaner 120 and the stripper 110 are disposed along the Z-axis with respect to each other. The cleaver 130, the cleaner 120 and the stripper 110 are disposed in a linear relationship along the longitudinal direction of the optical waveguide. The cleaner 120 is arranged between the cleaver 130 and the stripper 110. The cleaver 130 comprises a blade 131 for scratching the optical waveguide 101. The blade 131 is moveable along the X-axis to scratch the optical waveguide. In a further embodiment the blade 131 is immoveable with respect to the X-axis. An anvil (not explicitly shown) may break the optical waveguide 101 at the scratched part, such that the optical waveguide is cleaved. The apparatus 100 may also comprise clamping members.

The apparatus 100 comprises an actuator assembly 140. The optical waveguide 101 may be moved by the actuator assembly 140 with respect to the stripper 110, the cleaner 120 and the cleaver 130. The actuator assembly 140 comprises at least one roller 141 which may rotate to move the optical waveguide 101. The roller 101 may be actuated by a motor (not explicitly shown), for example an electric motor or other suitable device.

During operation of the apparatus 100 the end 167 of the optical waveguide 101 is inserted into the apparatus 100 at the roller 141. The insertion process starts with inserting the end 167 at the roller 141 and ends such that the end 167 is disposed at the heater 111. The optical waveguide is inserted into the apparatus 100, such that it moves forward through the actuator assembly 140, the cleaver 130, the cleaner 120 and the blades 112 and 113 of the stripper 110.

The apparatus is actuated, for example, by pressing an actuation switch (not explicitly shown). In response to the actuation switch, the heater 111 heats the optical waveguide 111 at least at the part 107. The blades 112 and 113 move generally perpendicular to the optical waveguide 101 in direction to the optical waveguide 101 such that the blades 112 and 113 engage the coating 164 of the optical waveguide 101. The roller 141 of the actuator assembly 140 begins to rotate and thereby transports the optical waveguide 101 with respect to the blades 112 and 113 along the negative Z-axis. Due to the movement of the optical waveguide 101, the coating 164 of the part 107 is removed from an optical fiber 165 (FIG. 10) by the blades 112 and 113.

The part 107, from which the coating 164 is removed and the optical fiber 165 is exposed, is moved to the cleaner 120 by the actuator assembly 140. The cleaning members 122 and 123 move generally perpendicular to the Y-axis for contacting the optical waveguide 101. The cleaning members 122 and 123 may move together with the blades 112 and 113. In another embodiment the blades 112 and 113 move to contact the optical waveguide 101 and the cleaning members 122 and 123 move after the blades 112 and 113. For example the blades 112 and 113 have disengaged the optical waveguide 101 when the cleaning members 122 and 123 move to engage the optical waveguide. Due to the movement of the cleaning ribbon 121 of the cleaning members 122 and 123 along the exposed optical fiber of the optical waveguide, the optical fiber is cleaned.

The optical waveguide 101 is moved further in the negative Z-direction until a sensor 104 detects a feature of the optical waveguide 101. For instance, the feature may be a characteristic feature such as a label, a marking and/or an inscription on the optical waveguide 101. The characteristic feature may be the edge between the exposed optical fiber and the part of the optical waveguide with the coating 164. By determining the edge of the end of the coating 164 a region where the optical waveguide 101 should be cleaved can be determined relative to the edge. The optical waveguide 101 is moved until the region where the optical waveguide should be cleaved is disposed at the blade 131. The movement is stopped and the optical waveguide is cleaved by scratching and then breaking the optical waveguide.

After the cleaving the optical waveguide may further be moved in the negative Z-direction and may be coupled to a clip 106. Then the optical waveguide may be removed out of the apparatus 100. For example the roller 141, the cleaning member 122 and the blade 113 are moved away from the optical waveguide and such the optical waveguide with the clip 106 may be removed.

The apparatus may comprise a control unit 105 which may be connected to the actuator assembly 140 and the sensor 104. The control unit 105 may also be connected to the stripper 110, the cleaner 120 and/or the cleaver 130. The sensor 104 is adapted to output signals which are representative of a determination of the characteristic feature of the optical waveguide. The control unit 105 is capable of receiving the signals of the sensor 104. The control unit 104 may control the actuator assembly dependent on the received signals of the sensor 104. The control unit 105 may control the stripper 110, the cleaner 120 and the cleaver 130 in response to the activation of the actuation button.

The apparatus 100 may comprise a container 103 for collecting the cut-off parts of the optical waveguide 101. The cut-off parts of the optical waveguide 101 may be moved into the container by a movement of the cleaning members 122 and 123. Container 103 may be removable from apparatus 100 so that the waste may be disposed off by removing and emptying the same. In yet a further embodiment, the apparatus comprises one or more transport units to transport the cut-off parts into the container.

Figure 2:
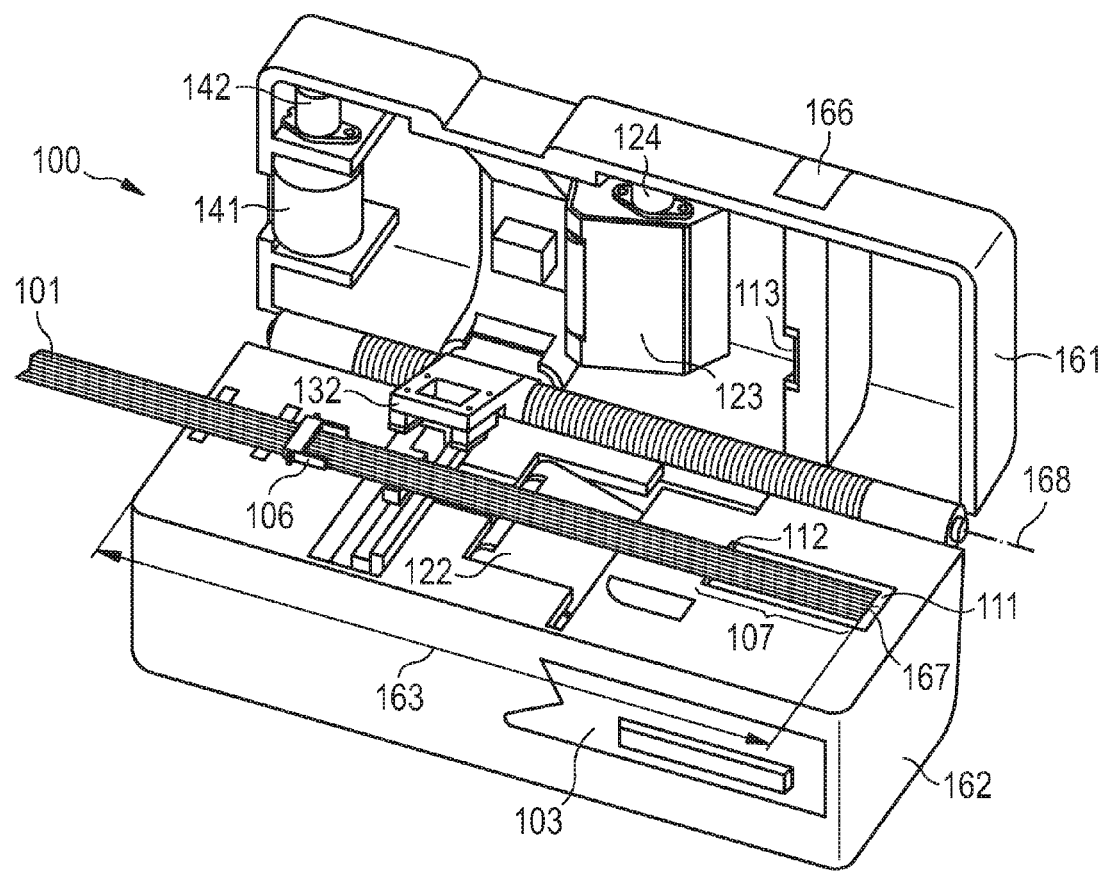
FIG. 2 schematically shows an apparatus according to a further embodiment according to a first operating state.
Figure 6:
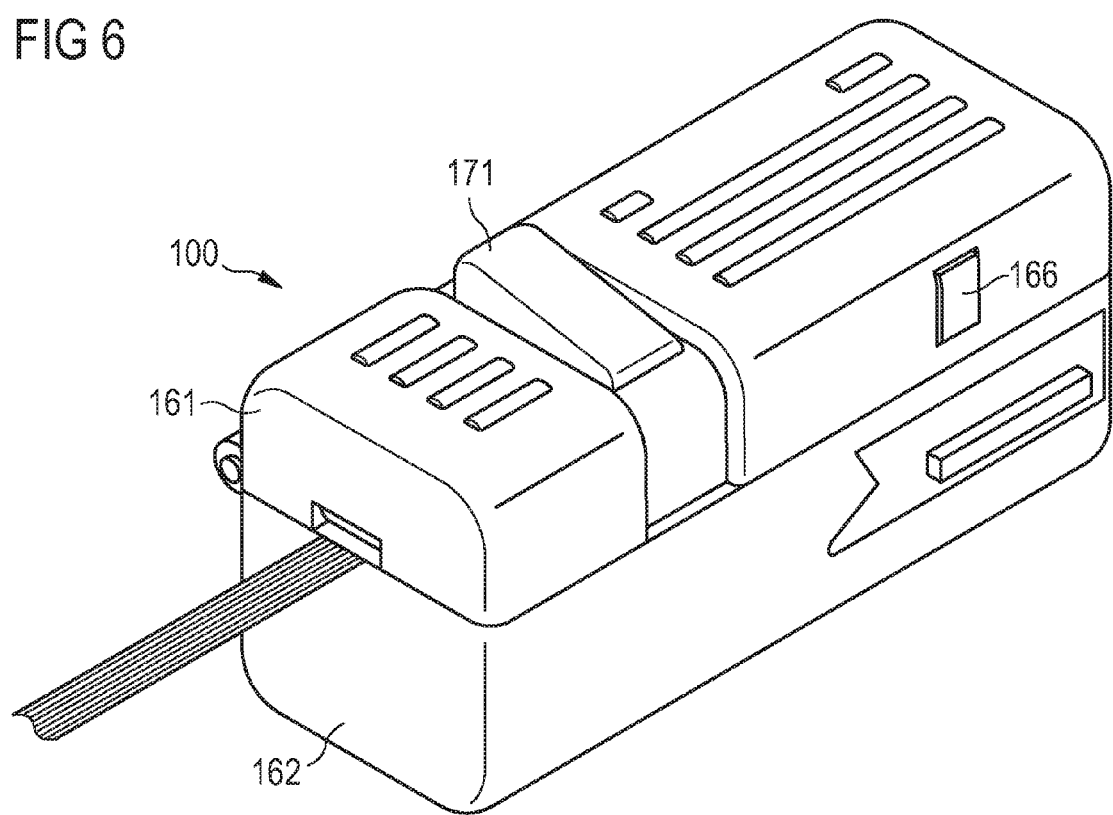
FIG. 6 schematically shows an apparatus according to the further embodiment according to a fifth operating state.

FIG. 2 shows the apparatus 100 in an open state for explanatory purposes. A top 161 is movable with respect to a support 162 around an axis 168. During operation the apparatus normally would be closed (FIG. 6).

The stripper 110, the cleaner 120 and the cleaver 130 and the actuator assembly 140 respectively are arranged partly at the top 161 and partly at the support 162. The heater 111 and the cutting blade 112 of the stripper 110 are arranged at the support 162. The cutting blade 113 is arranged at the top 161. The cleaning member 122 of the cleaner 120 is arranged at the support 162. The cleaning member 123 is arranged at the top 161. The blade 131 for scratching the optical waveguide is arranged at the support 162. The roller 141 for moving the optical waveguide is arranged at the top 161. The parts of the stripper 110, the cleaner 120, the cleaver 130 and the actuator assembly 140 which are arranged at the top 161 are moveable with respect to the parts that are arranged at the support 162.

At the top 161 of the apparatus 100 a motor 124 is arranged. The motor 124 is capable of actuating the cleaning member 123 such that the cleaning ribbon 121 moves with respect to the optical waveguide 101. A further motor 142 is arranged at the top 161. The further motor 142 may rotate the roller 141.

A button 166 is disposed at the top 161. The button 166 is for activating the apparatus. By pressing the button 166 the stripping, the cleaning and/or the cleaving may be actuated. The button 166 may be coupled with the control unit 105.

The optical waveguide 101 is partly inserted into the apparatus 100 such that a part 163 is disposed inside the apparatus 100. The optical waveguide 101 extends through the clip 106. The end 167 of the optical waveguide 100 is disposed on the heater 111. The part 107 of the optical waveguide 100 is disposed on the heater 111. At this state, the processing of the optical waveguide may start.

The apparatus 100 may comprise guide rails for guiding the optical waveguide inside the apparatus, for example for an adjustment of the optical waveguide with respect to at least the cleaver. If the apparatus is used for processing more than one optical waveguide at the same time, the means for guiding may adjust the optical waveguides with respect to each other.

Figure 3:
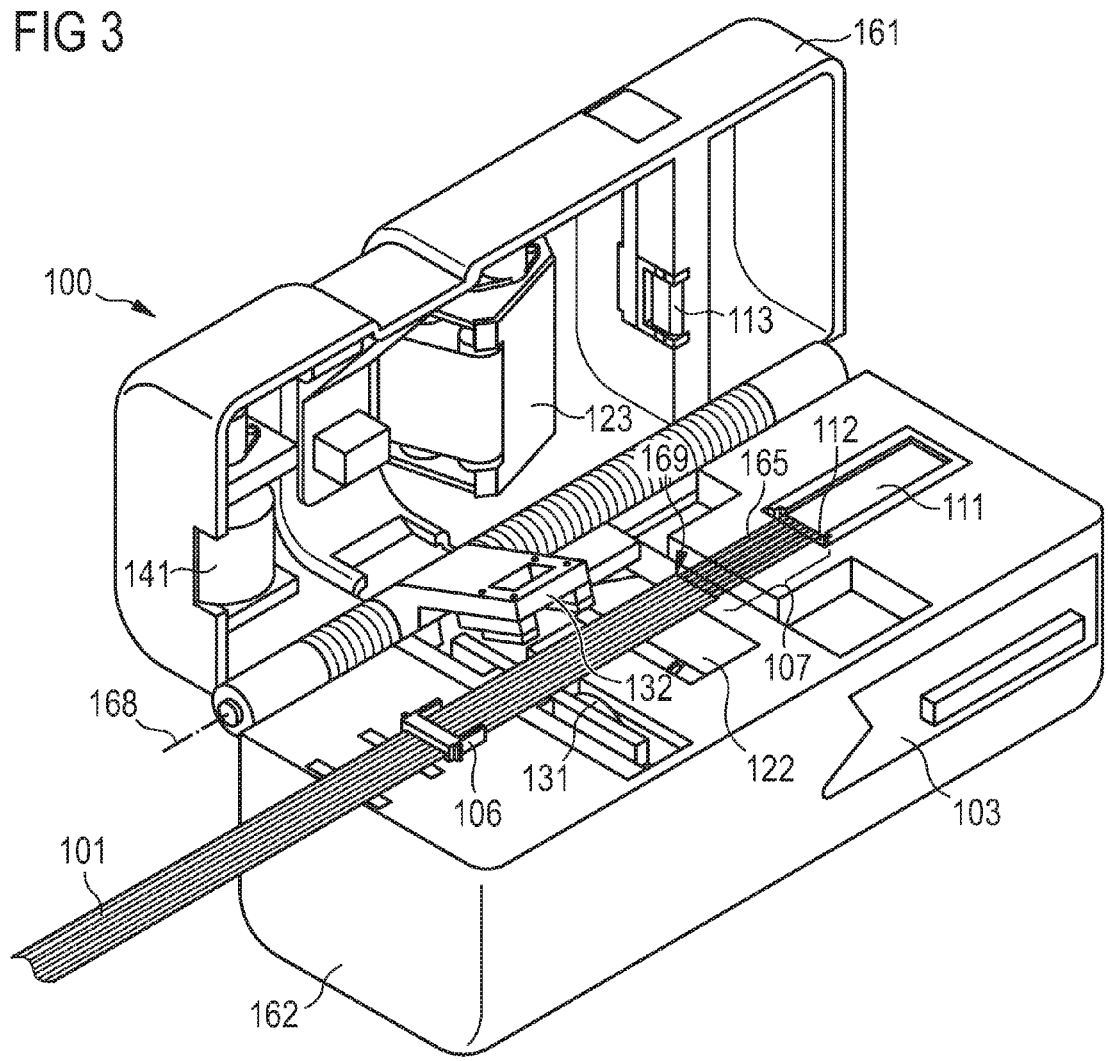
FIG. 3 schematically shows an apparatus according to the further embodiment according to a second operating state.

FIG. 3 shows the optical waveguide 101 after the coating 164 has been removed at the part 107. For example the removed coating of the part 107 is moved into a container for collecting waste coatings. The edge 169, which may be the characteristic feature of the optical waveguide 101, is the end of the coating and the beginning of the exposed part 107. To reduce energy consumption, the heater may be turned off after the stripping process is completed.

Figure 4:
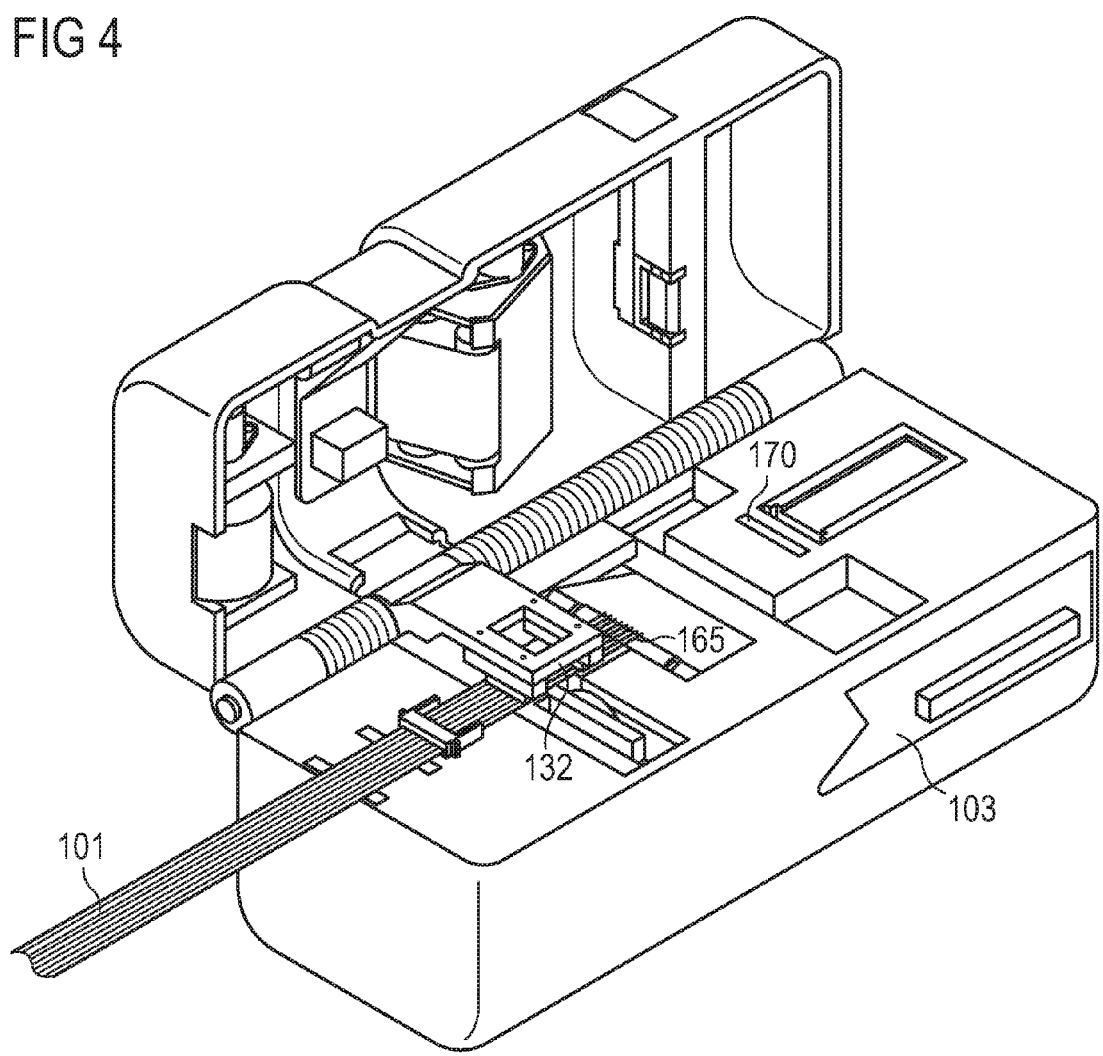
FIG. 4 schematically shows an apparatus according to the further embodiment according to a third operating state.

FIG. 4 shows the optical waveguide 101 further moved out of the apparatus 101 after the cleaning of the exposed optical fiber 165. At this position the optical waveguide 101 may be cleaved. The clamping jaws 132 engage the optical waveguide and the blade 131 may scratch the optical waveguide. The anvil (not explicitly shown) may break the optical waveguide. The cut-off parts of the optical fiber 165 may be moved into the container by a movement of the cleaning members 122 and 123.

Figure 5:
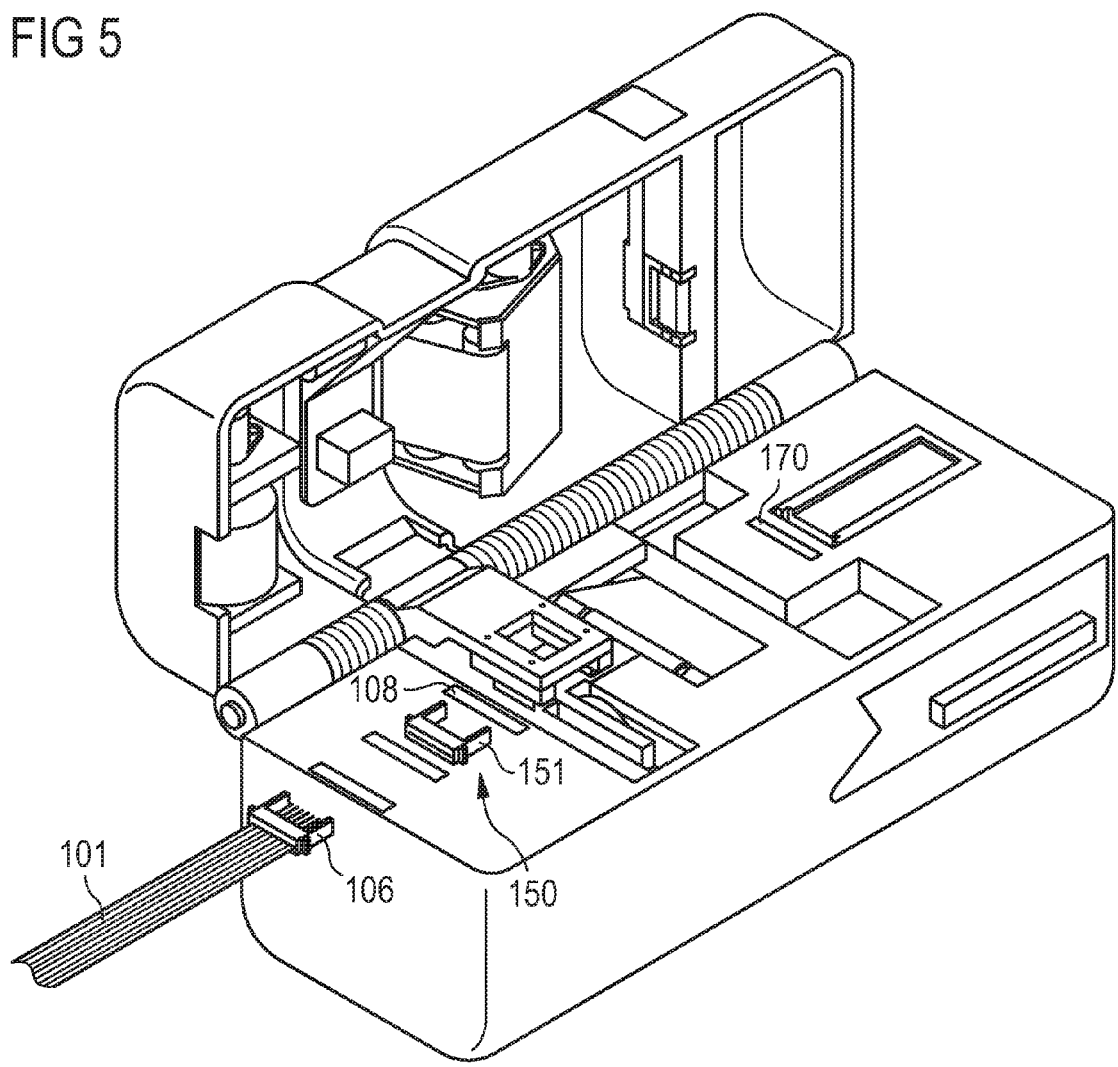
FIG. 5 schematically shows an apparatus according to the further embodiment according to a fourth operating state.

FIG. 5 shows the optical waveguide 101 when the process is completed. The optical waveguide 101 is removed out of the apparatus 100. The clip 106 is fixed at the end region of the optical waveguide 101. The end region is delimited by the end of the optical fiber 165 after the cleaving. The clip 106 may be glued onto the optical waveguide 101. For gluing the clip 106 to the optical waveguide 101 the apparatus 100 may comprise a means for gluing. The means for gluing may be part of a clip preparation unit 150. In a further embodiment the clip 106 may be clamped to the optical waveguide 101. The clip preparation unit 150 may also comprise a clip depot 151. A multitude of clips may be stored at the clip depot 151.

The sensor 108, which may be a light barrier or any other kind of sensor which is capable of detecting the characteristic feature of the optical waveguide 101, is disposed between the clip depot 151 and the cleaver 130. A further sensor 170 may be arranged adjacent to the stripper 110. The sensors 108 and 170 can detect characteristic features of the optical waveguide 101 and can output at least one signal which contains information representative for the determination of a characteristic feature. The apparatus 100 can be controlled by the control unit 105 dependent on the signals of the sensors. The actuator assembly 140 can be controlled by the control unit dependent on the signals of the sensors. The movement of the optical waveguide 101 is controlled by the control unit dependent on the signals of the sensors.

FIG. 6 shows the apparatus 100 in a closed state. The top 161 and the support 162 are at least partly in contact with each other. Usually, the apparatus 100 is used in the closed state to process the optical waveguide. The apparatus 100 is opened to remove the optical waveguide after processing is completed. The unprocessed optical waveguide 101 may be inserted into the closed apparatus. The button 166 is pressed for starting the processing. In response to the pressing of the button 166, the stripping, the cleaning and the cleaving may be processed. In an other embodiment only the stripping may be processed in response to the pressing of the button 166. The cleaning and the cleaving may be processed in response to pushing a further button 171.

Figure 7:
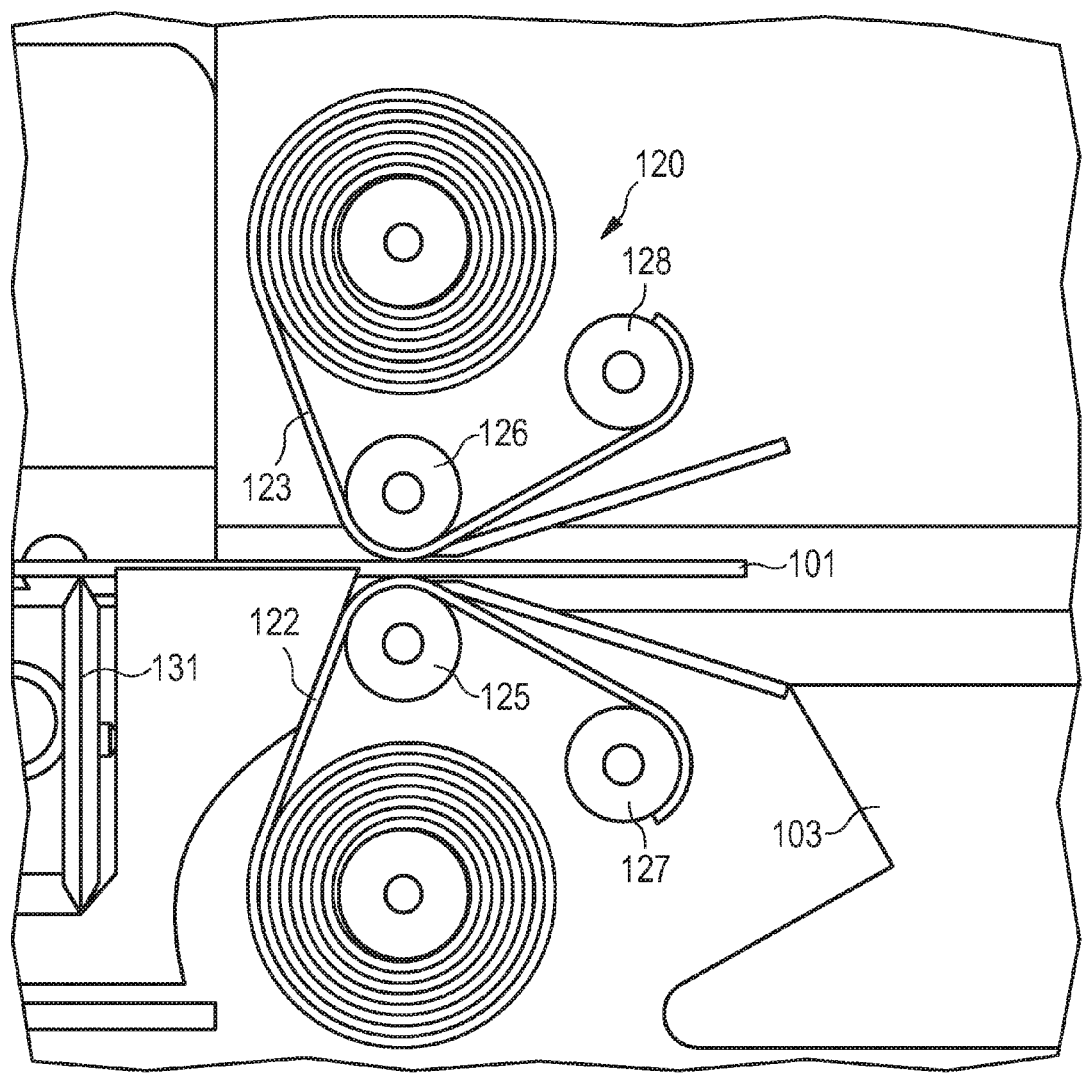
FIG. 7 schematically shows a more detailed view of a cleaner according to the further embodiment.

FIG. 7 schematically shows a detailed view of the cleaner 120. The cleaning member 122 and the cleaning member 123 are in contact with the optical waveguide 101. To clean the optical waveguide, the cleaning ribbon 121 of the cleaning member 122 is rolled-up by a roller 127. A further roller 125 presses the cleaning ribbon against the optical waveguide. The cleaning ribbon of the cleaning member 123 is rolled-up by a roller 128. A further roller 126 presses the cleaning ribbon against the optical waveguide. The direction of the movement of the respective cleaning ribbon at the contact area with the optical waveguide is opposite to the direction of the movement of the optical waveguide.

After the optical waveguide 101 is cleaved by a movement of the blade 131 and the pressure of the anvil, the cut-off part of the optical waveguide may be moved into the container 103 by a movement of the cleaning members 122 and 123. In case the blade 131 is immovable, the optical waveguide 101 may be cleaved by being pressed against the blade 131. The roller 125, the roller 126, the roller 127 and/or the roller 128 may rotate to move the cut-off part away from the blade 131 in direction to the container 103. For example the roller 126 rotates faster than the roller 125 to move the cut-off part of the optical waveguide in direction to the container 103 which is disposed at the same side of the optical waveguide as the roller 125. The cut-off part may be moved into the container 103 by other mechanisms, for example a lever which moves the cut-off part into the container. The cleaner 120 may be coupled to the cleaver 130 such that when the cleaver 130 has finished the cleaving process the cleaner is activated to move the cut-off part of the optical waveguide into the container.

Figure 8:
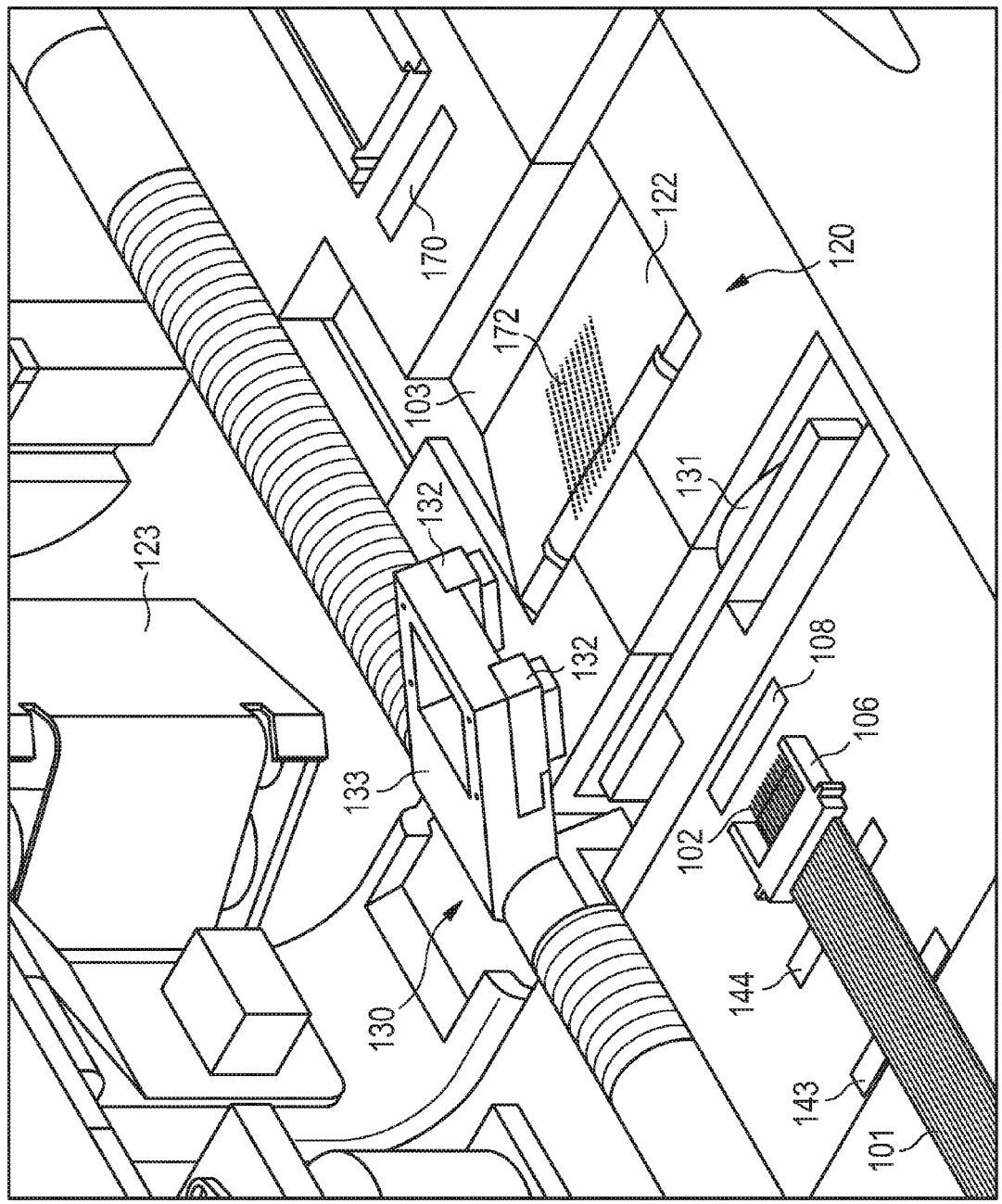
FIG. 8 schematically shows a more detailed view of the cleaving portion according to the further embodiment.

FIG. 8 shows a detailed view of the cleaver 130 and the cleaner 120. Cut-off parts 172 of the optical waveguide 101 are disposed on the cleaning member 122. By a movement of the cleaning member 122 and/or the cleaning member 123 the cut-off parts 172 may be moved into the container 103.

Exposed optical fibers 102 of the optical waveguide 101 are arranged in the clip 106. The part of the optical waveguide 101 outside the clip comprises a coating. The ends of the exposed parts 102 are particularly accurately aligned with respect to the clip 106.

The clamping jaws 132 may be arranged on a lever 133. The lever 133 is moveable with respect to the top 161 and the support 162. The lever 133 may be moved towards the support 162 to clamp the optical waveguide 101 to cleave the optical waveguide 101. Additionally, the optical waveguide may be clamped by the roller 141 and corresponding counter parts 143 and 144, which may be rollers respectively. The counterparts 143 and 144 are adapted to press the optical waveguide against the roller 141 such that a rotation of the roller 141 is transferred to the optical waveguide due to friction between the optical waveguide and the roller.

The clip 106 may be a part of an optical connector. For the transmission of signals over an optical transmission path, often optical signals are generated from electrical signals and fed into optical fibres. When the signals are received, the optical signals are coupled out from optical fibres and converted into electrical signals again for further processing. This may involve the use of optical connectors. The clip 106 may be a component of an optical connector to connect two different optical waveguides. The clip 106 may be a preproduct of the optical connector. The clip fixed to the optical waveguide may simplify the assembling of the optical connector. Due to the fixed clip, the end of the waveguide may be easily set with respect to the connector. If the optical waveguide comprises more than one optical fiber, the clip may set the position of the respective optical fibers with respect to each other.

Figure 9:
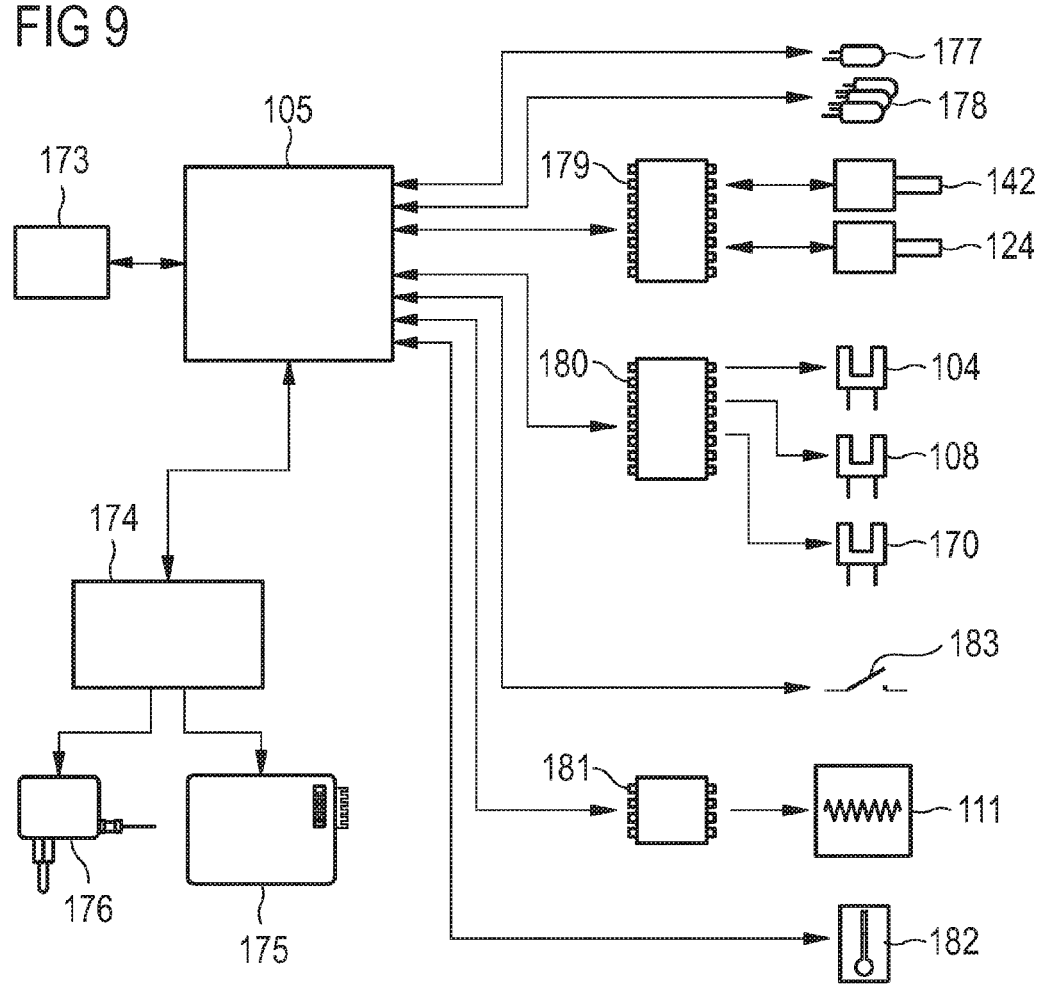
FIG. 9 schematically shows an electronic layout of an apparatus.

FIG. 9 schematically shows the electronic layout of the apparatus 100. The apparatus comprises a power supply 174. The power supply 174 may be connected with a battery 175. The battery 175 may be a rechargeable battery pack for supplying electrical power to the apparatus. A mains power supply 176 may be coupled to the power supply 174, for example, to charge the battery 174. The power supply 174 is coupled with the control unit 105. An interface 173 may be provided, for example, a USB interface. The interface 173 is coupled with the control unit 105.

The control unit 105 is adapted to control the apparatus. The control unit 105 may control the movement of the optical waveguide 101 with respect to the apparatus. The control unit 105 may control the stripping, the cleaning and/or the cleaving of the optical waveguide. The control unit may control the stripping, the cleaning and/or the cleaving dependent on a position of the characteristic feature of the optical waveguide with respect to the apparatus. For controlling the movement of the optical waveguide with respect to the stripper, the cleaner and/or the cleaver, a motor driver 179 may be coupled with the control unit 105. The motor 142 may be coupled with the motor driver 179. The motor driver 179 may be controlled by the control unit 105. The motor driver 179 may control the motor 142 to move the optical waveguide 101 with respect to the apparatus in response to position signals from at least one of the sensors 104, 108 and 170.

The motor 124 of the cleaner 120 is coupled with the motor driver 179. The motor driver 179 may control the motor 124 to actuate at least one of the cleaning members to clean an exposed optical fiber of the optical waveguide. The motor driver 179 may also control the motor 124 to move at least one of the cleaning members to transport a cut-off part of the optical waveguide into the container 103.

The sensors 104, 108 and 170 are coupled to a sensor driver 180. The sensor driver 180 is coupled to the control unit 105. The sensors 104, 108 and 170 are adapted to determine a characteristic feature of the optical waveguide 101. For example, the respective sensors 104, 108 and 170 each comprise an optical sensor. One or more of the respective sensors 104, 108 and 170 may comprise a photodiode. One or more of the respective sensors 104, 108 and 170 may comprise an electromagnetic sensor or any other suitable sensor which is adapted to determine the characteristic feature of the optical waveguide. By determining the characteristic feature a position of the end of the optical waveguide with respect to the apparatus may be determined. The apparatus may comprise more then three position sensors, for example, four or more position sensors. In an other embodiment, the apparatus may comprise less then three position sensors, for example, two more position sensors or one position sensor. The apparatus may comprise other sensors, for example, a sensor to detect an end of the cleaning ribbon.

A switch 183 may be coupled with the control unit 105. The switch may be closed in response to pushing the button 166. The control unit 105 may start processing the optical waveguide in response to a closing of the switch 183. A heater driver 181 may be coupled with the control unit 105. The heater driver 181 is coupled with the heater 111. A temperature sensor 182 may be coupled to the control unit 105 to provide information of the temperature of the heater 111. The apparatus may comprise means 177 and 178 for outputting status information. The means 177 and 178 are coupled with the control unit 105. For example, the means 177 and 178 comprise one or more light emitting diodes (LEDs). For example a power on/off or a heating and/or an error may be signalized by the means 177 and 178.

A processing of the optical waveguide may be started by closing the switch 183. In response to a detection of a closed switch 183 the control unit 105 may start heating the optical waveguide by activating the heater 111. In response to a temperature signal outputted by the sensor 182 the control unit 105 may start the stripping process. The control unit 105 may activate the motor 142 to move the optical waveguide with respect to the stripper. One of the sensors 104, 108 and 170 may detect the characteristic feature of the optical waveguide and output an according signal. In response to that signal the control unit 105 may stop the motor 142.

The control unit 105 may activate the motor 124 for starting the cleaning of the exposed optical fiber. The control unit 105 may activate the motor 142 to further move the optical waveguide with respect to the apparatus to the cleaving position. The control unit 105 may stop the movement when at least one of the sensors has determined a desired position of the optical waveguide with respect to the cleaver. The control unit 105 may process the cleaving. The control unit 105 may activate the motor 124 for moving cut-off parts of the optical waveguide into the container 103. The clip 106 may be fixed to the optical waveguide. The clip 106 may be fixed to the optical waveguide prior to the cleaving operation. By fixing the clip to the optical waveguide prior to the cleaving operation waveguide, the position of the clip with respect to the cleaving position can be adjusted accurate. The optical waveguide may be taken out of the apparatus together with the clip.

Figure 10:
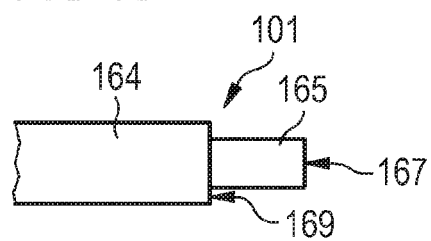
FIG. 10 schematically shows an optical waveguide.

FIG. 10 shows the optical waveguide 101. The optical waveguide 101 comprises the optical fiber 165 at the middle region of the optical waveguide. The optical fiber is capable of guiding light. The optical fiber 165 is surrounded by the coating 164. The optical fiber 165 may comprise a cleading and a core. The core may be surrounded by the cleading. The cleading may comprise a material with a lower refraction index than the core. A multitude of optical waveguides may be combined to an optical waveguide ribbon (fiber ribbon).

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present disclosure and are intended to be covered by the appended claims. It will also be apparent to those skilled in the art that various modifications and variations can be made without departing from the spirit and scope of the same. Thus, it is intended that the present invention cover the modifications and variations provided they come within the scope of the appended claims and their equivalents.

We claim:

1. An apparatus for processing at least one optical waveguide, the apparatus comprising a combination of:
   a stripper, the stripper being adapted to remove an outer coating of a part of the at least one optical waveguide;
   a cleaner, the cleaner being adapted to clean the part of the at least one optical waveguide, the cleaner comprising at least one cleaning ribbon to clean the part of the at least one optical waveguide;
   a cleaver, the cleaver being adapted to cleave the at least one optical waveguide; and
   at least one sensor for determining a feature of the at least one optical waveguide;
   an actuator assembly to move the at least one optical waveguide with respect to at least one of the stripper, the cleaner and the cleaver, wherein the actuator assembly comprises at least one roller, the at least one roller being rotatable to move the at least one optical waveguide and being capable of clamping the at least one optical waveguide.

2. The apparatus of claim 1, wherein the sensor is arranged adjacent to the cleaver to determine a position of the feature with respect to the cleaver.

3. The apparatus of claim 1, comprising at least one activation switch to activate the stripper, wherein the activation of the stripper activates the actuator assembly.

4. The apparatus of claim 1, comprising a container, wherein the cleaner is capable of moving at least one waste end of the at least one optical waveguide into the container.

5. The apparatus of claim 1, wherein the stripper, the cleaner and the cleaver respectively are arranged partly on a support and partly on a top, the top being moveable with respect to the support.

6. The apparatus of claim 1, wherein the at least one sensor comprises an optical sensor.

7. The apparatus of claim 1, wherein the at least one sensor is adapted to determine a position of the at least one optical waveguide comprising the outer coating and with the outer coating being removed.

8. The apparatus of claim 1, wherein the stripper, the cleaner and the cleaver are disposed in a linear relationship along the longitudinal extension of the at least one optical waveguide.

9. The apparatus of claim 1, wherein the cleaner is disposed between the stripper and the cleaver.

* * * * *